United States Patent Office 2,693,446
Patented Nov. 2, 1954

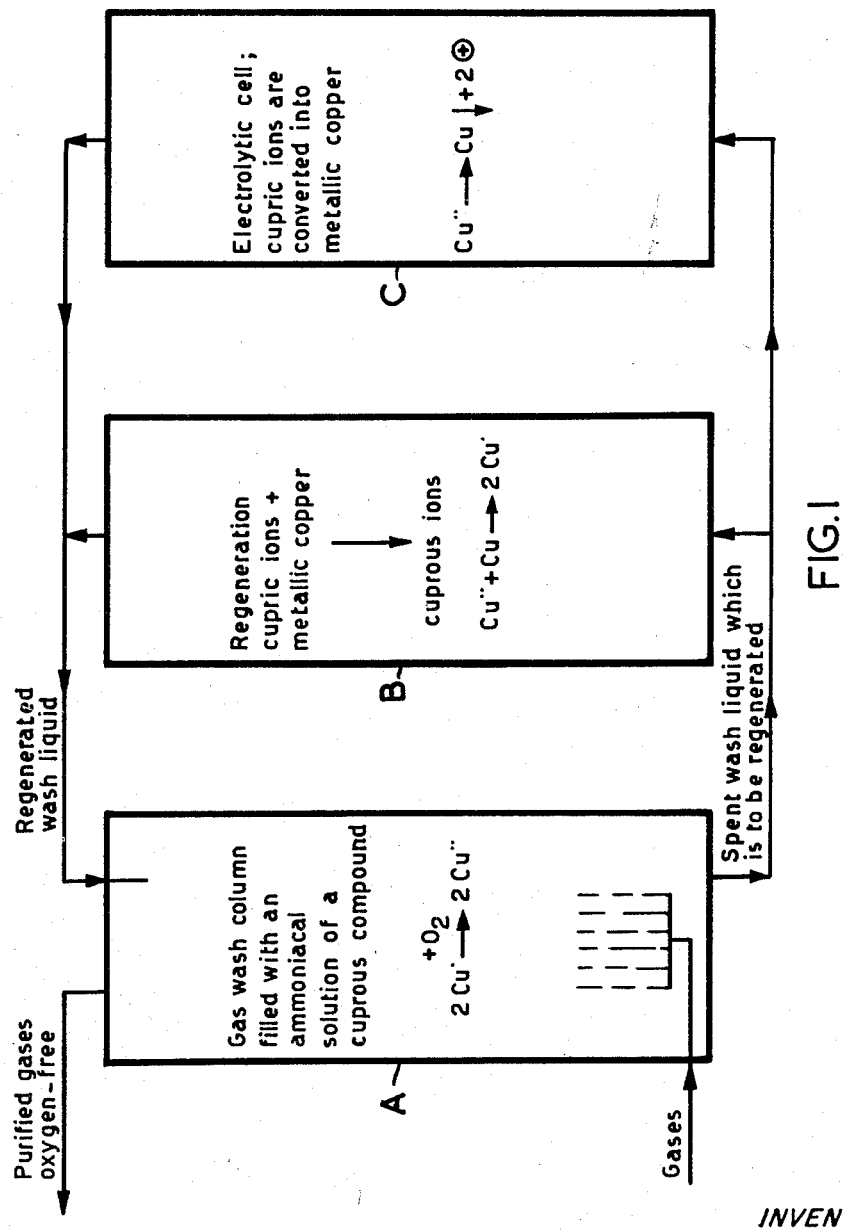

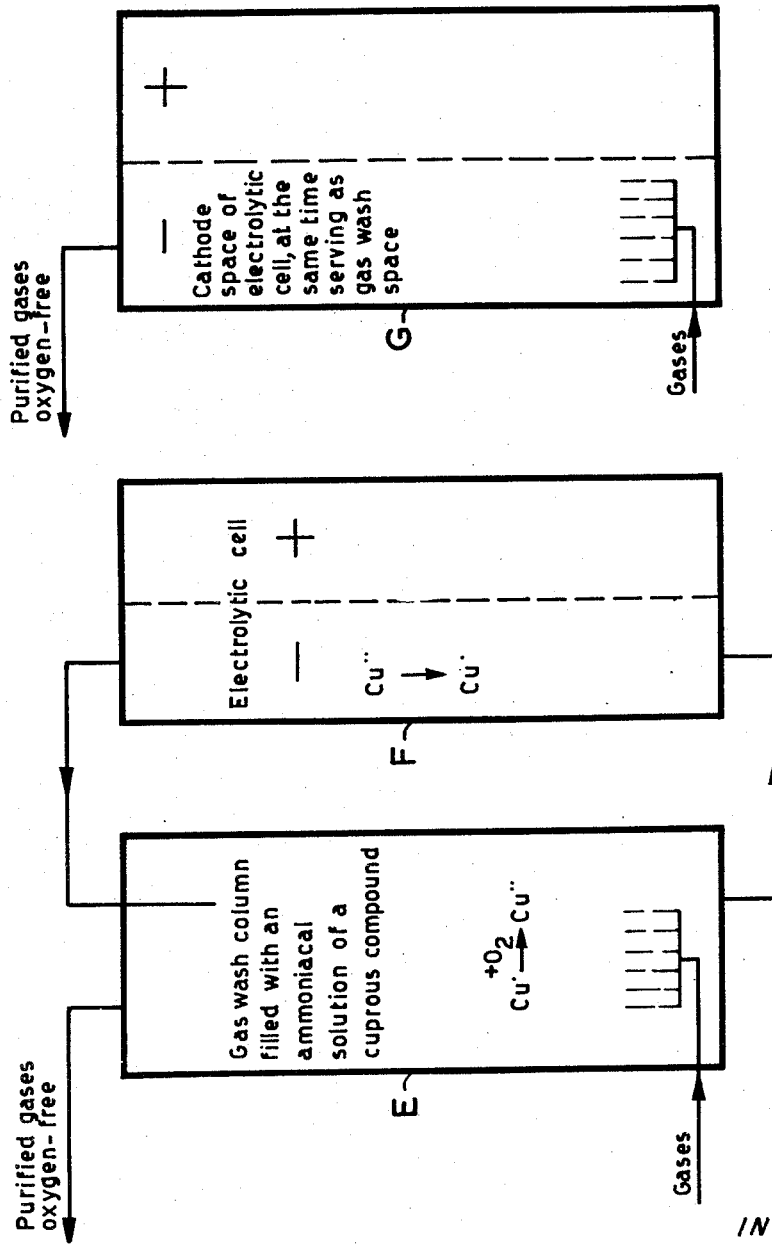

2,693,446

PROCESS FOR THE ELIMINATION OF OXYGEN FROM GASES

Dirk W. van Krevelen, Geleen, Netherlands, assignor to De Directie van de Staatsmijnen in Limburg, Handelend voor en namens de Staat der Nederlanden, Heerlen, Netherlands Application January 12, 1950, Serial No. 138,143

Claims priority, application Netherlands January 14, 1949

4 Claims. (Cl. 204—91)

This invention relates to the purification of gases, which gases must be thoroughly freed from oxygen.

More particularly, the invention relates to the elimination of small amounts of oxygen from gases by washing these gases with oxygen-absorbing solutions.

According to a well-known method gases may be freed from oxygen by passing the gases through an ammoniacal solution of a cuprous compound, to which solution also copper shavings have been added for the purpose of reducing the cupric compounds, formed during the gas wash process, which will effect a regeneration of the wash liquid.

A drawback attached to this process is, that owing to this regeneration of the wash liquid with copper shavings, the copper concentration of the solution increases continuously.

When operating on a small scale—as for instance in gas analysis—it is possible to re-establish the right copper concentration by discharging periodically a part of the wash liquid and subsequently adding a copper-free ammoniacal solution to the remaining wash liquid.

When operating on a small scale it is also customary to use a fresh ammoniacal cuprous solution, if the old solution should have dissolved too much copper. For a process which is to be applied on a technical scale, this is naturally not attractive, since the method will be discontinuous and the consumption of chemicals will be expensive.

A principal object of the invention is to improve the method for eliminating oxygen from gases, by means of washing these gases with an ammoniacal solution of a cuprous compound in such a manner, that the purification method can be applied as a continuous process on a technical scale. A further object of the invention is the introduction of such new improvements into the method for eliminating oxygen from gases, by means of washing these gases with an ammoniacal solution of a cuprous compound, such that the addition of copper shavings to the wash liquid may be dispensed with. A third object of the invention is to improve the method for eliminating oxygen from gases, by means of washing these gases with an ammoniacal solution of a cuprous compound, in such a manner that the amount of copper contained in the wash liquid remains constant so that the wash liquid may be applied for a long time; renewing of the wash liquid will not be needed.

The present invention aims at improving a process for freeing gases from oxygen, effected by passing the gases through an ammoniacal solution of cuprous compounds, in such a way that the wash liquid is regenerated, directly or indirectly, by means of an electrochemical reduction; as a result of this improvement the amount of copper in the solution remains constant, so that no copper shavings have to be added.

In order that the invention will be more readily understood, reference is had to the drawings, explaining several methods of performance of the process.

In Fig. 1 A represents a gas wash column in which the oxygen contained in the gases is absorbed by an ammoniacal solution of a cuprous compound and owing to this absorbtion the cuprous ions are converted into cupric ions.

B represents a regeneration column, in which the spent wash liquid is regenerated by means of metallic copper.

C represents an electrolytic cell, in which cupric ions are converted into metallic copper by means of electric energy.

In Fig. 2 E represents a gas wash column and F an electrolytic cell; in the cathode space of this cell the cupric ions—formed during the gas wash process in column E—are converted into cuprous ions.

In Fig. 3 G represents an electrolytic cell; the cathode space of this cell serves at the same time as gas wash space.

The elimination of oxygen from gases may be carried out in a known way by means of a gas wash column, in which the gases flow counter currently to the spent wash liquid.

According to the invention the cupric compounds formed during the gas wash process are converted into cuprous compounds by means of an electrochemical reduction, effecting an indirect regeneration of the spent wash liquid (see Fig. 1) by dividing the spent wash liquid, withdrawn from a washing column A into two substantially equal parts, whereafter one part is led through a regeneration column B, in which a regeneration is effected by means of metallic copper, while the other part is led through an electrolytic cell C, in which metallic copper will be precipitated and retained, and by uniting the two liquid flows, withdrawn from the regeneration column and electrolytic cell, and re-introducing them into column A; the said regeneration column B and electrolytic cell C being so constructed, as to serve alternately both as regenerating column and as electrolytic cell.

In this manner, the copper, separated in the one period, is dissolved again in the following period. When this process is applied the wash liquid needs not be renewed nor is it necessary to add copper to the system.

For the electrode in the electrolytic cell either copper shavings or metal gauzes may be used; the metal gauzes may consist for instance of chromium nickel steel, which gauzes in the electrolytic cell are coated with copper, which copper is dissolved in the regeneration column.

According to another realization of the invention the wash liquid is regenerated by a direct electrochemical reduction, in which, during the electrolysis, the cupric compounds are reduced to cuprous compounds without making use of metallic copper.

This method is represented schematically in Figure 2.

The liquid, withdrawn from the wash column E, is circulated through the cathode space of an electrolytic cell F.

Since, on account of the electrolysis, the acidity of the liquid in the anode space is increased, said liquid would exert an intensively corroding effect upon the anode.

If nevertheless it is desired to employ a chromium nickel steel anode, the pH shall be kept at a value of at least 8.

For maintaining the desired alkalinity, the invention provides for the continuous supply of ammonia to the anode liquid.

This may be achieved by circulating the anode liquid through a vessel, to which measured quantities of gaseous ammonia are continuously supplied.

The circulation thus created also seems to have a favourable effect upon the reactions developing inside the anode space.

It is also possible to supply the gaseous ammonia directly to the anode space of the electrolytic cell.

Preferably the entire gas wash and regeneration process is carried out in one single reaction vessel, which in this case naturally has to serve as an electrolytic cell.

This method is represented schematically in Figure 3.

The gas which has to be freed from oxygen is passed through the cathode space of an electrolytic cell G, which space contains ammoniacal copper solutions, while simultaneously gaseous ammonia is supplied to the anode space.

In this manner both the content with respect to the cuprous ions and the acidity can be kept constant.

From the anode space oxygen escapes. Both the latter oxygen and the gas treated in the cathode space entrain gaseous ammonia, which losses are compensated by supplying ammonia to the anode liquid.

From the gas which has been freed of oxygen, the entrained ammonia can be removed by means of sulphuric acid.

As acid component in the complex ammonia-copper compounds i. e. sulphate, formate and acetate may be used, and in connection with possible high copper concentrations preferably the latter two.

The losses of acid residue, caused by electrodiffusion, will then have to be compensated by adding acid to the wash liquid.

The losses of formic acid and ammonia amount to about 3 kgs. per m.$^3$ of eliminated oxygen.

The reduction of cupric compounds to cuprous compounds should only be carried so far, that no metallic copper is separated.

The admissible cupric/cuprous relation depends on a great many circumstances.

In general no difficulties will be encountered at a value of 0.25.

The process according to the invention is further elucidated by means of the following example, which example describes the elimination of oxygen from technical argon, but this does not imply, however, that the process is restricted to this particular example.

*Example*

The plant used was constructed in such a manner that the washing liquid after leaving the washer was continuously passed through the cathode space of an electrolytic cell.

The argon to be purified contained 3% oxygen. Of this impure gas 60 m.$^3$ were treated daily so that 1800 l. oxygen had to be washed out. Since about 300 gram mols of a cuprous compound can be oxidized to the cupric compound by this amount of oxygen, 12.5 gram mols of copper had to be reduced per hour. 1 l. of the washing liquid contained 1 gram mol of cuprous compound of which about 10% were oxidized while the gas was passed through the circuit so that 125 l. of washing liquid were consumed per hour.

The required intensity of current amounted to 335 A., the admissible current density being 1 A. per dm.$^2$ The surface area of the electrode measured 3.5 m.$^2$ and was obtained by applying a chromium nickel steel gauze with 6 wires of 0.40 mm. per cm.$^1$ The external surface area of said gauze measured 1.7 m.$^2$ The electrode spaces were separated by a wall of porous material. During the action of the surface, oxygen was developed at the anode whereas at the cathode no gas development was observed. As washing liquid an ammoniacal solution of cuprous sulphate was used which—after the regeneration—had a specific gravity of 1.15 (20° C.) and which contained:

0.2 gram mol of cupric aminosulfate
1.0 gram mol of ammonium sulphate
1.0 gram mol of free ammonia per l. in addition to 1 gram mol of the cuprous compound.

The daily energy consumption of the regeneration amounted to about 55 kw./h., while moreover about 5 kgs. of ammonia had to be added to the anode liquids and about 5 kgs. of sulphuric acid to the washing liquid, in order to make up for the losses. The ammonia was supplied in a separate space through which the anode liquid was circulated. As a result hereof the pH of this liquid was never below 8. After the washing the argon had absorbed a small amount of ammonia which was eliminated by washing it with dilute sulphuric acid, taking care to exclude the air carefully. The oxygen content of the purified argon amounted to 0.002%.

I claim:

1. A process for the elimination of oxygen from gases comprising the steps of washing a continuous stream of gas with an ammoniacal solution of a cuprous compound, continuously regenerating the wash solution in the cathode space of an electrolytic cell by electrochemical reduction, whereby cupric compounds formed in the course of the gas wash are reduced to cuprous compounds, continuously supplying ammonia to the anode liquid of said cell to maintain said liquid alkaline, withdrawing oxygen from the anode space of said cell, and continuously recirculating the regenerated wash solution to the washing zone.

2. The process of claim 1, wherein the anode liquid of said cell is continuously circulated through a vessel distinct from said cell, whereat said ammonia is supplied.

3. A process for the elimination of oxygen from gases comprising the steps of washing a continuous stream of gas with an ammoniacal solution of a cuprous compound, continuously circulating said wash solution through the cathode space of an electrolytic cell, continuously regenerating said wash solution in said electrolytic cell by electrochemical reduction whereby cupric compounds formed in the course of the gas wash are reduced to cuprous compounds, continuously supplying ammonia to the anode liquid of said cell to maintain said liquid alkaline, withdrawing oxygen from the anode space of said cell, and continuously recirculating the regenerated wash solution to the washing zone.

4. A process for the elimination of oxygen from gases comprising the steps of washing a continuous stream of gas with an ammoniacal solution of a cuprous compound in the cathode space of an electrolytic cell, continuously regenerating the cathode liquid by electrochemical reduction whereby cupric compounds formed in the course of the gas wash are reduced to cuprous compounds, continuously supplying ammonia to the anode liquid of said cell to maintain said liquid alkaline, and withdrawing oxygen from the anode space of said cell.

References Cited in the file of this patent

UNITED STATES PATENTS

| Number | Name | Date |
|---|---|---|
| 867,046 | Juman | Sept. 24, 1907 |
| 1,891,974 | Fischer | Dec. 27, 1932 |
| 2,043,263 | Porter | June 9, 1936 |
| 2,047,550 | Dely | July 14, 1936 |

FOREIGN PATENTS

| Number | Country | Date |
|---|---|---|
| 21,595 of 1907 | Great Britain | Feb. 27, 1908 |
| 26,829 of 1907 | Great Britain | Jan. 4, 1909 |
| 516,610 | Great Britain | Jan. 5, 1940 |